W. A. GREENLAW.
FLEXIBLE PIPE JOINT.
APPLICATION FILED APR. 25, 1908.
918,144.
Patented Apr. 13, 1909.
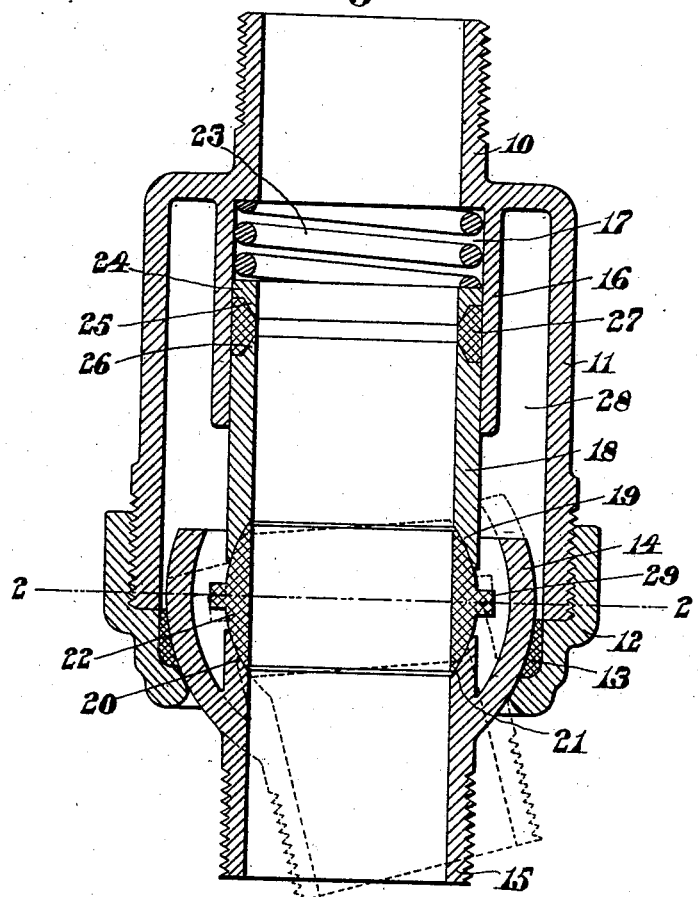
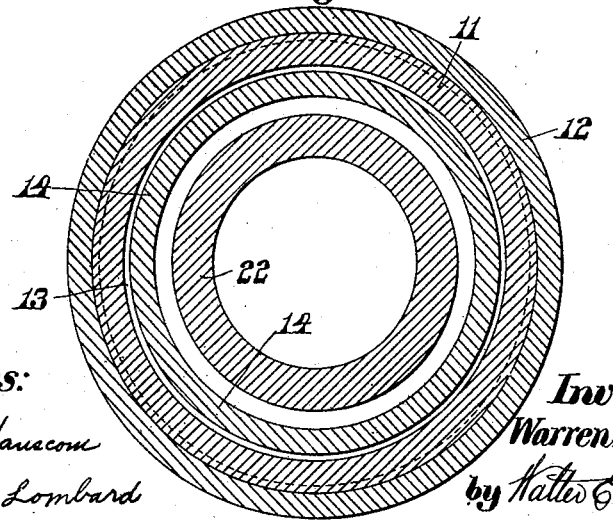
Witnesses:
Howard Hanscom
Nathan C. Lombard
Inventor:
Warren A. Greenlaw,
by Walter E. Lombard,
Atty.

UNITED STATES PATENT OFFICE.

WARREN A. GREENLAW, OF MELROSE HIGHLANDS, MASSACHUSETTS, ASSIGNOR TO THE GREENLAW MANUFACTURING COMPANY, OF BOSTON, MASSACHUSETTS, A CORPORATION OF MAINE.

FLEXIBLE PIPE-JOINT.

No. 918,144.  Specification of Letters Patent.  Patented April 13, 1909.

Application filed April 25, 1908. Serial No. 429,282.

*To all whom it may concern:*

Be it known that I, WARREN A. GREENLAW, a citizen of the United States of America, and a resident of Melrose Highlands, in the county of Middlesex and State of Massachusetts, have invented certain new and useful Improvements in Flexible Pipe-Joints, of which the following is a specification.

This invention relates to flexible pipe joints and has for its object the production of a joint in which the friction between the socket member and the ball member working therein will be reduced to a minimum end it consists in providing the socket member and the ball member each with a semi-spherical seat between which is interposed a floating semi-spherical ring provided with means for limiting the movement thereof.

The invention further consists in certain novel features of construction and arrangement of parts which will be readily understood by reference to the description of the drawings and to the claims hereinafter given.

Of the drawings: Figure 1 represents a vertical section of a joint embodying the features of this invention, and Fig. 2 represents a transverse section of the same, the cutting plane being on line 2—2 on Fig. 1.

Similar characters designate like parts throughout the drawings.

In the drawings, 10 represents a pipe member provided with an enlarged cup-shaped end 11 to which is threaded a coupling ring 12 provided with an annular packing 13 the interior face of which forms a semi-spherical seat for the ball end 14 of the pipe member 15.

The socket member 10—11 is provided with an annular axial flange 16 forming a cylindrical chamber 17 to which is fitted a tubular member 18, the outer end of which is provided with a semi-spherical seat 19. The ball member 15 is provided with an axial extension 20 projecting into the interior of the ball end 14 and provided with a semi-spherical seat 21. Between the semi-spherical seats 19 and 21 is interposed a ring 22 the outer face of which is semi-spherical and conforms to the seats 19 and 21 between which said ring 22 is interposed.

The tubular member 18 is forced into contact with the ring 22 and the ring 22 with the seat 21 of the extension 20 by means of the spring 23 in the inner end of the chamber 17. This spring 23 bears upon a follower ring 24 having a wedge-shaped flange 25 between which and a similar wedge-shaped flange 26 on the inner end of the tubular member 19 is interposed a packing 27. The spring 23 forces the follower ring 24 firmly into contact with the packing 27 and causes the wedge-shaped flanges 25 and 26 to act thereon to force the packing outwardly into contact with the inner wall of the chamber 17 to thoroughly pack the joint between the tubular member 18 and the annular flange 16 and thereby prevent the material passing through the joint from escaping into the interior of the enlarged chamber 28 within the cup-shaped end 11. Should any material escape into this chamber it would act upon the interior of the ball end 14 to force it more firmly against its seat on the packing 13.

The normal position of the ring 22 is as shown in the drawings and this ring is made of a metal softer than that from which the ball end 14 and the tubular member 18 are made.

The ring 22 is provided with a peripheral flange 29 against which the ends of the extension 20 and tubular member 18 are adapted to co-act to limit the movement of the ring in either direction. It is obvious that if the pipe member 15 is moved to the right from the position in which it is shown in Fig. 1 to a position in which it is shown in dotted lines in said figure, the seat 21 will ride over the exterior surface of the semi-spherical ring 22 until the end of the extension 21 comes into contact with the under side of the flange 29 and any continued movement of the pipe member 15 will cause the ring to be moved with said pipe member until the flange 29 comes into contact with the inner edge of the tubular member 18. This reduces the friction upon the joint when the ball and socket members are at an extreme angle to each other inasmuch as it provides a means whereby the various parts extend for a less distance within the cylindrical passage for the flow of material through the joint, thus making less obstruction for the flow of material and as a consequence leaving less surface for the material to bear against and thus increase of friction between the movable parts.

It is believed that from the foregoing the operation and many advantages of the invention will be fully understood.

Having thus described my invention, I claim:

1. In a flexible pipe joint, the combination of a ball member provided with a semi-spherical seat; a socket member provided with a semi-spherical seat; a ring for coupling said members together having a semi-spherical seat for said ball member; and a floating ring interposed between the seats on said tubular member and ball member.

2. In a flexible pipe joint, the combination of a ball member provided with an axial extension terminating in a semi-spherical seat; a socket member provided with a semi-spherical seat; a ring for coupling said members together having a semi-spherical seat for said ball member; and a floating ring interposed between the seats on said tubular member and ball member.

3. In a flexible pipe joint, the combination of a ball member provided with an axial extension terminating in a semi-spherical seat; a socket member having a cylindrical chamber; a ring for coupling said members together having a semi-spherical seat for said ball member; a tubular member in said chamber provided with a semi-spherical seat; and a floating ring interposed between the seats on said tubular member and ball member.

4. In a flexible pipe joint, the combination of a ball member provided with an axial extension terminating in a semi-spherical seat; a socket member having a cylindrical chamber; a ring for coupling said members together having a semi-spherical seat for said ball member; a tubular member in said cylindrical chamber provided with a semi-spherical seat; a spring in said chamber acting on said tubular member; and a floating ring interposed between the seats on said tubular member and ball member.

5. In a flexible pipe joint, the combination of a ball member provided with an axial extension terminating in a semi-spherical seat; a socket member having a cylindrical chamber; a ring for coupling said members together having a semi-spherical seat for said ball member; a tubular member in said chamber provided with a semi-spherical seat; a spring in said chamber acting on said tubular member; a packing between said tubular member and spring; and a floating ring interposed between the seats on said tubular member and ball member.

6. In a flexible pipe joint, the combination of a ball member provided with an axial extension terminating in a semi-spherical seat; a socket member having a cylindrical chamber; a ring for coupling said members together having a semi-spherical seat for said ball member; a tubular member in said chamber provided with a semi-spherical seat; a spring in said chamber acting on said tubular member; a packing between said tubular member and spring; an annular follower between said packing and spring; and a floating ring interposed between the seats on said tubular member and ball member.

7. In a flexible pipe joint, the combination of a ball member provided with an axial extension terminating in a semi-spherical seat; a socket member having a cylindrical chamber; a ring for coupling said members together having a semi-spherical seat for said ball member; a tubular member in said chamber provided with a semi-spherical seat; a spring in said chamber acting on said tubular member; a packing between said tubular member and spring; an annular follower between said packing and spring provided with a wedge-shaped extension adapted to act upon said packing; and a floating ring interposed between the seats on said tubular member and ball member.

8. In a flexible pipe joint, the combination of a ball member provided with an axial extension terminating in a semi-spherical seat; a socket member having a cylindrical chamber; means for coupling said members together; a tubular member in said chamber provided at its outer end with a semi-spherical seat and at the other with an inclined annular wall; a packing ring surrounding said annular wall; an annular follower superimposed upon said packing ring; a spring interposed between said follower and the bottom of said chamber; and a floating ring interposed between said seats.

9. In a flexible pipe joint, the combination of a ball member provided with an axial extension terminating in a semi-spherical seat; a socket member having a cylindrical chamber; means for coupling said members together; a tubular member in said chamber provided at its outer end with a semi-spherical seat and at its inner end with an inclined annular wall; a packing ring surrounding said annular wall; an annular follower superimposed upon said packing ring and provided with a wedge-shaped flange adapted to act on said packing; a spring interposed between said follower and the bottom of said chamber; and a floating ring interposed between said seats.

Signed by me at Boston, Mass., this 23d day of April, 1908.

WARREN A. GREENLAW.

Witnesses:
WALTER E. LOMBARD,
EDNA C. CLEVELAND.